Sept. 20, 1960 J. H. DEWITT, JR., ET AL 2,953,710

TELEVISION CAMERAS

Filed May 3, 1957 2 Sheets-Sheet 1

INVENTORS
JOHN H. DEWITT, JR.
AARON C. SHELTON
BY
Albert and Chromy
their ATTORNEYS

TELEVISION CAMERAS

Filed May 3, 1957 2 Sheets-Sheet 2

INVENTORS
JOHN H. DeWITT, JR.
AARON C. SHELTON
BY
Allen and Chromy
their ATTORNEYS

United States Patent Office 2,953,710
Patented Sept. 20, 1960

2,953,710

TELEVISION CAMERAS

John H. De Witt, Jr., 3602 Hoods Hill Road, Nashville 12, Tenn., and Aaron C. Shelton, 6216 Jocelyn Hollow Road, Nashville 5, Tenn.

Filed May 3, 1957, Ser. No. 656,962

5 Claims. (Cl. 315—10)

This invention relates to a method and apparatus for improving the useful life of image orthicon tubes such as are used in television cameras.

An object of this invention is to provide an apparatus for decreasing the undesired tendency of images of bright scenes to stick in the target of image orthicon tubes such as are used in television cameras.

Another object of this invention is to provide a method of shifting the electronic image that is produced in the image section of the orthicon tube used in television cameras so that the tendency of an image to stick on the target is eliminated.

Still another object of this invention is to provide an improved television camera tube which may be focused on a relatively bright scene for relatively longer periods of time than is now practical without the image being retained or "burned in" on the target of the camera tube after the camera is no longer focused thereon.

Still a further object of this invention is to provide a television camera tube of the orthicon type with deflection coils that are associated with the image section of the tube for the purpose of shifting the image therein at the same time as the voltages applied to the horizontal and vertical deflecting coils of the tube are correspondingly varied, whereby the difficulty with images of relatively bright scenes being retained in the image section beyond the actual viewing of the scene is eliminated.

Other and further objects of this invention will be apparent to those skilled in the art to which it relates from the following specification, claims and drawing.

Practically all television cameras used commercially today utilize the type 5820 or similar tubes manufactured by RCA and the General Electric Company for image conversion from light to electrical impulses. This tube consists of a semi-transparent photocathode at one end on which the light image is projected. Approximately two inches back of this photocathode within the glass envelope is a very thin glass target in front of which at a very short distance (.001") is a very fine mesh screen. Electrons from the photocathode are accelerated by a potential of about 500 volts across to the target through the mesh and form an electronic image within the target glass. Since the thin glass in the target is partially conductive the charges constituting the image may be neutralized or swept off by an electron scanning beam playing on the target from the opposite side. The return electrons from this scanning beam are caught on an electron multiplier which amplifies the signal currents to a level of usefulness in the television system.

The useful life of the tubes is determined not by the usual factors such as cathode emission failure or gas but by a phenomenon which takes place within the glass target known as "ionization." This "ionization" apparently decreases the possible mobility of the electrons within the glass causing images to "stick" if the image is held on one area of the target for any appreciable length of time.

Our invention is directed toward a reduction of "stickiness" in the target and thereby provides a great improvement in the useful life of these complicated and expensive tubes.

In accordance with this invention there is provided a relatively simple aand inexpensive arrangement and method of eliminating the difficulty discussed in the foregoing paragraphs by providing a method and apparatus for shifting the position of the image of the scene produced on the target in the image section of the television camera tube of the orthicon type to prevent the retention of this image, particularly of a bright scene that is being televised, after the camera is no longer focused on such scene. This shifting is accomplished by providing auxiliary horizontal and vertical deflection coils to the image section of the camera tube and supplying these coils with suitable currents that have a low frequency alternating current component. At the same time, a component of the same frequency is introduced into the main horizontal and vertical deflecting coils of the camera tube so that the scanning beam of the tube is also shifted a corresponding amount. Accordingly, while the image in the image section of the camera tube is periodically shifted at a relatively low frequency, the scanning of the image target is also correspondingly shifted and as a result the image, even of a bright scene, it not impressed upon the target in the image section of the tube long enough to be retained beyond the time that the actual scene is focused thereon.

Further details of this invention are set forth in the following specification, claims and drawing in which briefly:

Figure 1:
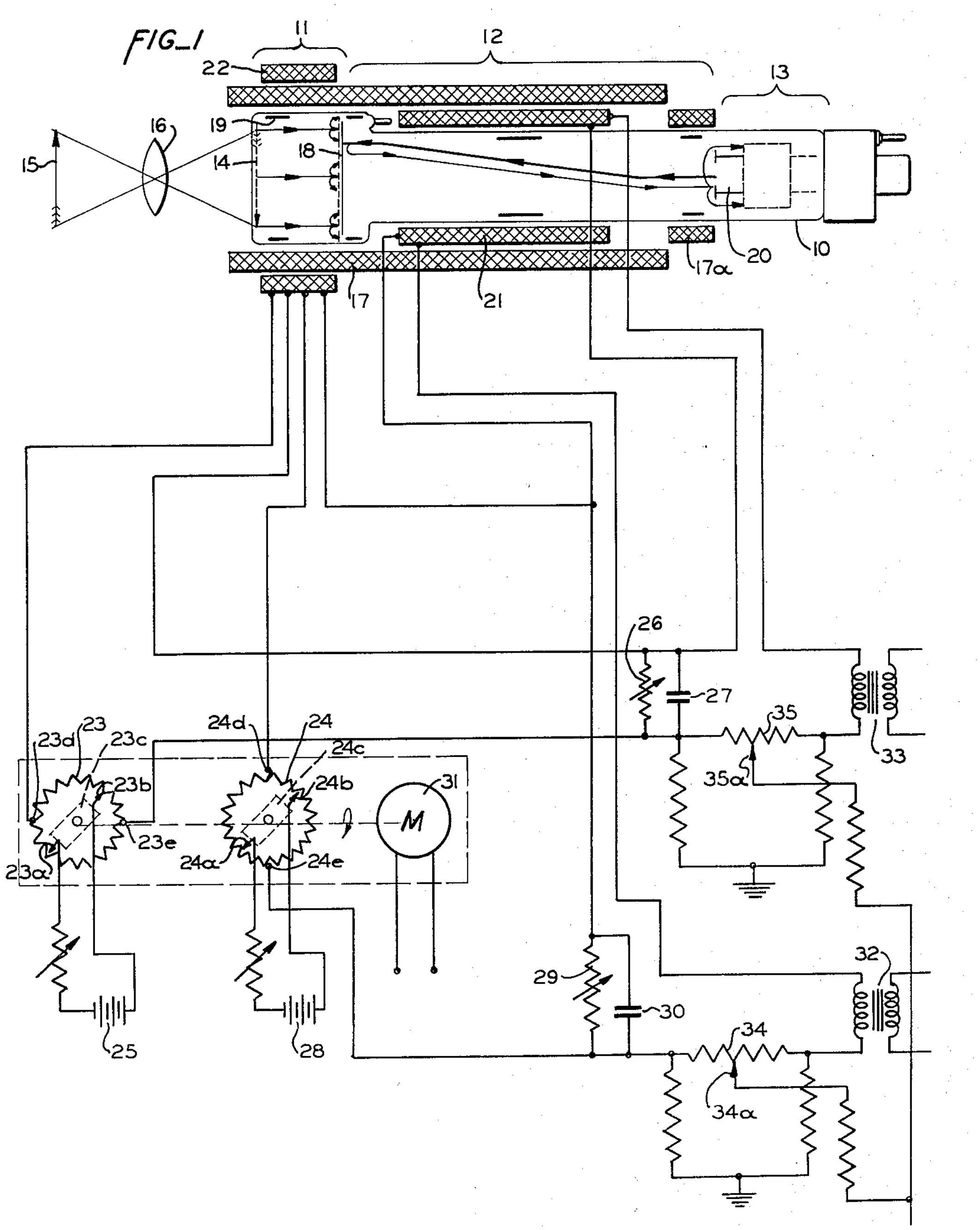
Figure 1 is a schematic wiring diagram of an image orthicon camera tube connected in accordance with this invention.

Referring to the drawing in detail there is illustrated in Figure 1 a schematic representation of an image orthicon tube 10 of the type commonly employed as a television camera tube in television broadcasting stations, and this tube comprises an image section 11, a scanning section 12 and the electron gun and multiplier section 13. Each of these sections is of conventional design and the image section includes a semi-transparent photocathode 14 on which the televised image 15 is focused by the lens system 16 so that the image of the scene is formed on this photocathode and electrons emitted therefrom are focused by the focusing coil 17 and accelerated by the accelerator electrode 19 to the two sided glass target electrode 18 through the mesh or screen 18*a* which is spaced a small fraction of an inch from the target 18. The other side of the target 18 is scanned by a cathode ray beam generated in the electron gun 20, said beam being scanned over the target 18 through the operation of horizontal and vertical deflecting coils positioned in the yoke 21.

In general it is desired to have the beam travel parallel to the lines of force of the magnetic field of the coil 17 in order to keep helical motion of the beam to a minimum. The fields of the deflection coils in the yoke 21 contribute to this helical motion. Consequently an alignment coil 17*a* is employed to correct for helical motion introduced into the beam resulting from misalignment of the gun 20 and the magnetic field produced by the focusing coil 21 and also to correct for the disturbance produced by the deflecting coils. The image section of the conventional orthicon tube is provided with auxiliary horizontal and vertical deflection coils which are illustrated in Figure 1 by the unitary coil structure or yoke 22. The action of the auxiliary horizontal and vertical deflection coils is such as to produce a movement having a horizontal and a vertical component, of the electronic image formed on the target 18. The positioning of these coils 22*v* and 22*h* in different quadrants may be such as is illustrated in the schematic drawing, Figure 2, in which the tube 10 is viewed from the photocathode end. Thus the relationship between the alternating current components of the currents supplied to the auxiliary horizontal and vertical deflecting coils 22*h* and 22*v* is such that one is out of phase with the other by substantially 90° so that if one is represented by the sine the other will be represented by the cosine.

Figure 2:
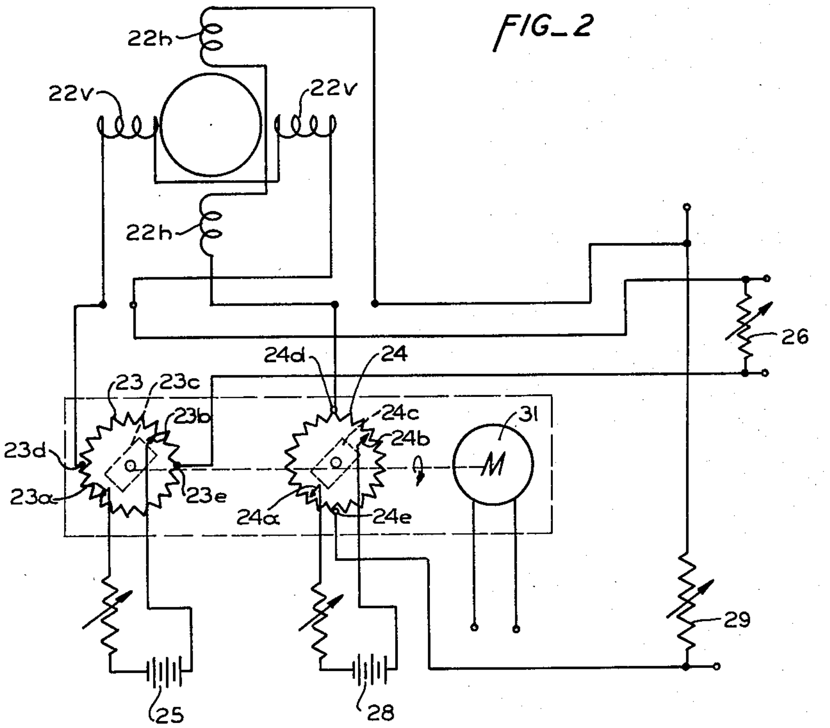
Figure 2 is a schematic diagram of the image end of the tube showing the auxiliary deflection coils.

Deflecting currents having this relationship and suitable for energizing these deflecting coils may be produced by a pair of circular potentiometers 23 and 24, each of which have a pair of motor driven wiper contacts which are connected to separate sources of current supply. Thus the potentiometer 23 is provided with wiper contacts 23*a* and 23*b* that are supported at diametrically opposite points on an insulation support 23*c* and these contacts are connected to opposite sides of the battery 25 or other suitable source of current supply. Diametrically opposite points 23*d* and 23*e* of the potentiometer 23 are connected to the terminals of the vertical deflection coils 22*v* as shown in Figure 2 and one side of this connection includes a variable resistor or potentiometer 26 shunted by a capacitor 27. The potentiometer 24 is provided with wiper contacts 24*a* and 24*b* that are supported at diametrically opposite points of the other rotatable member 24*c* which is also of insulation material. These wiper contacts are also connected to a current source, for example battery 28. Diametrically opposite points 24*d* and 24*e* of the potentiometer 24 are connected to the horizontal deflecting coils 22*h* and a variable resistor or potentiomter 29 that is shunted by the capacitor 30, is interposed in one side of this connection.

The wiper contacts 23*a*—23*b* and 24*a*—24*b* are rotatable by the motor 31 so as to produce a relatively low frequency current having a frequency of approximately five to fifteen cycles per minute which is applied to the auxiliary horizontal and vertical deflecting coils as described above. Components of these currents are also applied to the main horizontal and vertical deflecting coils 21 through the use of the vertical and horizontal neutralizing potentiometers 26 and 29 which are connected in series with the vertical and horizontal deflecting coils 22*v* and 22*h*, respectively, as described.

Capacitors 27 and 30 are connected across the neutralizing potentiometers 26 and 29, respectively, for the purpose of preventing the feeding of scanning sawtooth voltages from the vertical and horizontal sawtooth supplies from affecting the electron image shifting circuit. Only small voltages are required in the image shifting circuit as compared to the magnitudes of the vertical and horizontal sawtooth voltages which of course should be kept out of the image section circuit.

The sawtooth voltages to be applied to the main horizontal and vertical scanning coils are generated by conventional generators and supplied to the inputs of the transformers 32 and 33, respectively. The output of the transformer 32 is connected to the horizontal deflecting coil in the main deflecting yoke 21 through the centering potentiometer 34 and also through the potentiometer 29 so that a component of the alternating current generated in the circuit of the circular potentiometer 24 is modulated onto the horizontal scanning sawtooth voltage. Likewise, the output of the transformer 33 is connected to the vertical section of the main deflecting coils 21 through the centering resistor 35 and through the variable neutralizing potentiometer 26 so that the vertical sawtooth scanning voltage is modulated by the cosine wave voltage developed across the potentiometer 26.

Suitable circuits for applying a centering voltage are connected to the wiper contacts of the centering potentiometers 34 and 35 and these wiper contacts 34*a* and 35*a* are connected together to a voltage source so that the magnitude of the centering voltage applied to each of the deflecting circuits may be varied or controlled by varying the wiper contacts 34*a* and 35*a*.

Figure 3:
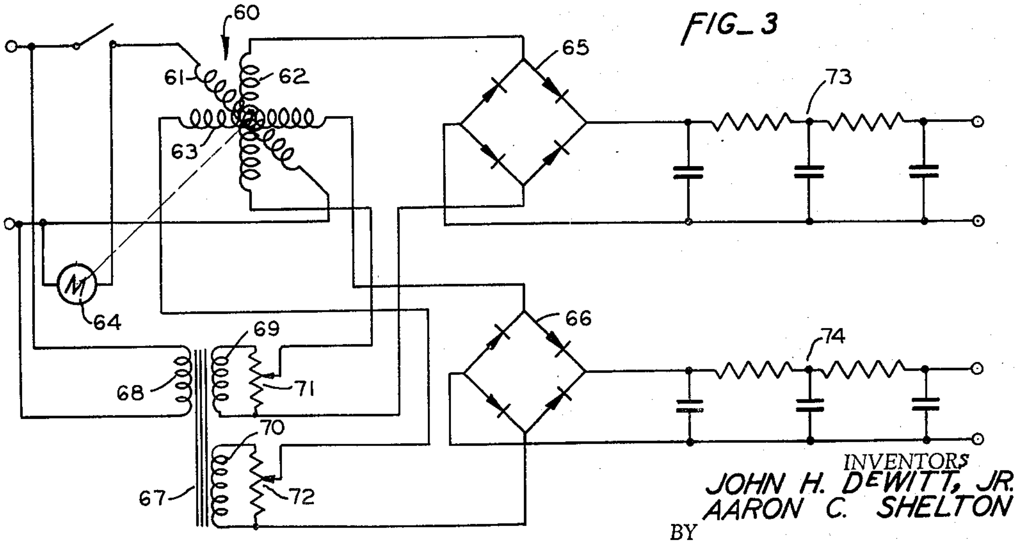
Figure 3 is a schematic wiring diagram of a modified circuit for providing the horizontal and vertical deflection currents to the auxiliary deflecting coils of the image section of the tube as well as the auxiliary deflecting current component supplied to the main deflecting coils of the tube.

In Figure 3 there is illustrated a modified form of low frequency pulsating current supply that is preferable to the generating apparatus shown in Figure 2 since the rotatable wipers associated with the circular resistors or potentiometers, which have a very limited life, are eliminated thereby. This apparatus comprises a resolver 60 which includes a rotatable coil 61 and stationary coils 62 and 63 arranged with respect to the rotatable coil so that the low frequency voltage induced into the coil 62 is substantially 90° out of phase with respect to that induced into the coil 63. This low frequency voltage forms an envelope for the 60 cycle input voltage that is supplied to energize the rotatable input coil 61 and this 60 cycle voltage is, of course, also induced into the fixed coils 62 and 63.

A transformer 67 having a primary 68 connected to the 115 volt 60 cycle supply and a pair of secondaries 69 and 70 connected in series with the coils 62 and 63, respectively is provided to supply a 60 cycle component to the inputs of the rectifiers 65 and 66, respectively. This arrangement supplies a 60 cycle voltage component to the inputs of the rectifiers for the purpose of neutralizing an out of phase component of the 60 cycle alternating current supplied to these inputs. For this purpose the voltages supplied by the secondaries 69 and 70 are adjusted by the potentiometers 71 and 72, respectively. These voltages will be either subtracted from or added to the out of phase components mentioned above, depending upon the direction of rotation of the rotatable coil 61.

The outputs of the rectifiers 65 and 66 are connected to filter circuits 73 and 74, respectively and the outputs of the latter circuits are connected to the image section deflection coils 22*v* and 22*h* through the potentiometers 26 and 29 the same as the low frequency A.C. generator shown in Figure 2.

Both the potentiometer type A.C. generators shown in Figure 2 and the resolver type of generator shown in Figure 3 have been tried in practice and found satisfactory. The second type generator delivers the same type A.C. only with a D.C. component which is not harmful to operation. We have found that the frequency of the A.C. is determined on the upper side by the fact that if movement of the image on the target is not followed exactly by the scanning beam on the rear of the target some crawl of the picture is noticeable to viewers. If the frequency of the A.C. is too low and if the orthicon is very old and has developed "sticky" operation, then the image may burn or stick in the target. A frequency of five to fifteen cycles per minute has proved to be a good value. At this rate slight movement of the image is not noticeable and "sticking" of the image is greatly minimized. High frequencies like a 60 c.p.s. could be used but this would adversely affect the storage characteristics of the target during the frame interval.

In practice the amplitude of the A.C. signal supplied to the image section is adjusted to produce a movement of the image corresponding to about 10 percent of its width. The amount of neutralizing current fed into the scanning beam yokes is then adjusted until the output picture appears to stand still. It is also necessary to turn the image section deflection coils on their axis coincident with the tube axis until the axes of image deflection are aligned with scanning deflection.

While we have shown a preferred embodiment of the invention it will be understood that the invention is capable of variation and modification from the form shown so that its scope should be limited only by the scope of the claims appended hereto.

What we claim is as follows:

1. A television camera comprising a camera tube having a target, means for producing an electron image of the scene being televised on said target, means for scanning said target to produce a signal modulated in accordance with said scene, electromagnetic means for shifting the position of said electron image on said target to prevent undesired retention of the electron image on said target, means for generating a pulsating current for energizing said electromagnetic means, means for shifting the scanning of said target in synchronism with the shifting in position of said electron image, connections including variable means for supplying and controlling pulsating current from said generating means to said last mentioned means, and capacitors connected to said variable means to prevent feeding of voltages from said scanning means into the circuit of said generating means.

2. A television camera comprising a camera tube having a target, means for producing an electron image of the scene being televised on said target, means for scanning said target to produce a signal modulated in accordance with said scene, electromagnetic means for shifting the position of said electron image on said target to prevent undesired retention of the electron image on said target, means for generating a pulsating current for energizing said electromagnetic means, means for shifting the scanning of said target in synchronism with the shifting in position of said electron image, connections including variable means for supplying and controlling pulsating current from said generating means to said last mentioned means, and capacitors connected to said variable means to prevent feeding of voltages from said scanning means into the circuit of said generating means, said generating means including rectifying means for producing the pulsating direct current for shifting the position of said electron image.

3. A television camera comprising a camera tube having a target, means for producing an electron image of the scene being televised on said target, means for scanning said target to produce a signal modulated in accordance with said scene, electromagnetic means for shifting the position of said electron image on said target to prevent undesired retention of the electron image on said target, means for generating a pulsating current for energizing said electromagnetic means, means for shifting the scanning of said target in synchronism with the shifting in position of said electron image, connections including variable means for supplying and controlling pulsating current from said generating means to said last mentioned means, said generating means comprising a rotatable coil connected to a source of alternating current and fixed coils arranged with respect to said rotatable coil so that alternating voltages substantially 90° out of phase are induced into said fixed coils, and rectifying means connected to said fixed coils for producing a pulsating current for energizing said electromagnetic means to shift the electron image an amount equal to substantially one tenth the width thereof.

4. A television camera as set forth in claim 3, further characterized in that means for neutralizing a component of the voltage induced into said fixed coils is connected between these coils and the rectifying means.

5. A television camera comprising a camera tube having a target, means for producing an electron image of the scene being televised on said target, means for scanning said target to produce a signal modulated in accordance with said scene, electromagnetic means for shifting the position of said electron image on said target to prevent undesired retention of the electron image on said target, means for generating a pulsating current for energizing said electromagnetic means, means for shifting the scanning of said target in synchronism with the shifting in position of said electron image, connections including variable means for supplying and controlling pulsating current from said generating means to said last mentioned means, and means connected to said variable means to prevent feeding of voltages from said scanning means into the circuit of said generating means.

References Cited in the file of this patent

UNITED STATES PATENTS

| | | |
|---|---|---|
| 2,531,974 | Ellett | Nov. 28, 1950 |
| 2,632,864 | Hunter | Mar. 24, 1953 |
| 2,881,248 | Wilner | Apr. 7, 1959 |